US010249916B2

(12) United States Patent
Tyler et al.

(10) Patent No.: US 10,249,916 B2
(45) Date of Patent: Apr. 2, 2019

(54) CONNECTOR BARREL FOR A BATTERY MODULE

(71) Applicant: Johnson Controls Technology Company, Holland, MI (US)

(72) Inventors: Matthew R. Tyler, Brown Deer, WI (US); Richard M. DeKeuster, Racine, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 813 days.

(21) Appl. No.: 14/850,728

(22) Filed: Sep. 10, 2015

(65) Prior Publication Data
US 2016/0301111 A1 Oct. 13, 2016

Related U.S. Application Data

(60) Provisional application No. 62/146,853, filed on Apr. 13, 2015.

(51) Int. Cl.
*H01M 10/48* (2006.01)
*B60L 11/18* (2006.01)
(Continued)

(52) U.S. Cl.
CPC ............. *H01M 10/48* (2013.01); *B60L 11/18* (2013.01); *B60L 11/1879* (2013.01);
(Continued)

(58) Field of Classification Search
CPC .......................... H01M 10/48; H01M 10/0525
(Continued)

(56) References Cited

U.S. PATENT DOCUMENTS

D256,356 S    8/1980  Lazerson
D319,813 S    9/1991  Kozono
(Continued)

FOREIGN PATENT DOCUMENTS

EP    0921607    6/1999
EP    2355209    8/2011
(Continued)

OTHER PUBLICATIONS

PCT/US2016/017918 Search Report and Written Opinion dated May 3, 2016.

*Primary Examiner* — Abdullah Riyami
*Assistant Examiner* — Nader Alhawamdeh
(74) *Attorney, Agent, or Firm* — Fletcher Yoder, P.C.

(57) ABSTRACT

The present disclosure relates to a battery module. The battery module includes a housing defined by one or more walls. A wall of the housing includes an opening configured to create a passageway between an interior of the housing and an exterior of the housing. The battery module includes a connector barrel disposed within the opening. The connector barrel is a hollow conduit with a first open end opposite a second open end, and the connector barrel is configured to receive a low voltage signal connector through the first open end and a vehicle control module connector through the second open end. An external surface of the connector barrel includes a pair of protrusions configured to enable intimate contact between the wall of the housing and the connector barrel.

22 Claims, 4 Drawing Sheets

(51) Int. Cl.
*H01M 2/10* (2006.01)
*H01M 2/20* (2006.01)
*H01M 10/42* (2006.01)
*H01R 13/74* (2006.01)
*H01R 31/06* (2006.01)
*H01R 13/00* (2006.01)

(52) U.S. Cl.
CPC ........... *H01M 2/1077* (2013.01); *H01M 2/20* (2013.01); *H01M 10/425* (2013.01); *H01R 13/00* (2013.01); *H01R 13/743* (2013.01); *H01R 31/065* (2013.01); *B60L 11/1864* (2013.01); *H01M 2010/4278* (2013.01); *H01M 2220/20* (2013.01); *Y02T 10/7005* (2013.01); *Y02T 10/7061* (2013.01)

(58) Field of Classification Search
USPC ........... 439/188, 550, 562; 429/90; 180/65.1
See application file for complete search history.

(56) References Cited

U.S. PATENT DOCUMENTS

| | | | |
|---|---|---|---|
| 5,127,848 A | 7/1992 | Taguchi | |
| D335,647 S | 5/1993 | Hood | |
| 5,378,552 A | 1/1995 | Dixon, Jr. | |
| 5,681,178 A | 10/1997 | Kunkle | |
| D389,457 S | 1/1998 | Beranek | |
| 6,312,277 B1 | 11/2001 | Holub | |
| 6,372,377 B1 | 4/2002 | Ovshinsky et al. | |
| 6,376,122 B1* | 4/2002 | Cheeseman | H01M 2/0202 429/100 |
| D475,014 S * | 5/2003 | Kano | D13/133 |
| D588,990 S * | 3/2009 | Kok | D13/133 |
| D589,444 S * | 3/2009 | Kok | D13/133 |
| 7,722,372 B2 | 5/2010 | Matsumoto et al. | |
| 7,879,485 B2 | 2/2011 | Yoon et al. | |
| 7,892,011 B2 | 2/2011 | Beer | |
| 8,038,450 B2 | 10/2011 | Nakagawa | |
| 8,147,280 B2 | 4/2012 | Fernandez et al. | |
| 8,221,165 B2 | 7/2012 | DeWitte | |
| 8,237,400 B2 | 8/2012 | Gamboa et al. | |
| 8,328,581 B2 | 12/2012 | DeChazal | |
| D675,568 S | 2/2013 | Drew | |
| D678,203 S | 3/2013 | Corona | |
| 8,679,666 B1 | 3/2014 | Tsukamoto et al. | |
| 8,808,031 B2 | 8/2014 | Zhao | |
| 9,150,107 B2 | 10/2015 | Ferrel | |
| 9,321,340 B2 | 4/2016 | Maskew et al. | |
| D765,030 S * | 8/2016 | Tyler | D13/119 |
| 9,413,040 B2 | 8/2016 | Murakami et al. | |
| D803,778 S * | 11/2017 | Tononishi | D13/103 |
| 2001/0018294 A1* | 8/2001 | Kameyama | H01R 31/06 439/654 |
| 2007/0087266 A1 | 4/2007 | Bourke et al. | |
| 2012/0308869 A1* | 12/2012 | Obasih | H01M 2/0217 429/120 |
| 2014/0045026 A1* | 2/2014 | Fritz | H01M 2/1077 429/99 |
| 2014/0062493 A1* | 3/2014 | Farrell | B60L 11/18 324/426 |
| 2014/0327444 A1 | 11/2014 | Rollan et al. | |
| 2015/0069829 A1 | 3/2015 | Dulle et al. | |
| 2015/0217707 A1* | 8/2015 | Tanigaki | B60K 1/04 180/65.1 |
| 2015/0243946 A1 | 8/2015 | Ahn | |
| 2016/0043448 A1 | 2/2016 | Fritz | |
| 2016/0107530 A1 | 4/2016 | Roberts et al. | |
| 2016/0133908 A1 | 5/2016 | Zhao | |
| 2016/0197384 A1* | 7/2016 | DeKeuster | H01M 2/305 429/120 |
| 2016/0226112 A1 | 8/2016 | Maskew et al. | |

FOREIGN PATENT DOCUMENTS

| | | |
|---|---|---|
| WO | 9831059 | 7/1998 |
| WO | 2013188680 | 12/2013 |

* cited by examiner

CONNECTOR BARREL FOR A BATTERY MODULE

CROSS REFERENCE TO RELATED APPLICATIONS

This application claims priority to and the benefit of U.S. Provisional Application Ser. No. 62/146,853, entitled "Low Voltage Signal Connector Barrel Insert Molding for Sealing," filed Apr. 13, 2015, which is hereby incorporated by reference.

BACKGROUND

The present disclosure relates generally to the field of batteries and battery modules. More specifically, the present disclosure relates to a connector barrel disposed within a housing of a battery module that supports and guides electrical circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include electrical circuitry that is disposed within a housing of the battery module. It may be beneficial to provide components that support and guide the electrical circuitry within the housing. However, it may be difficult to manufacture these components and integrate them within the housing of the battery module. Furthermore, it may be difficult to design the geometry of these components such that they provide a desired amount of support within the limited space available within a battery module. Accordingly, it is now recognized that it may be desirable to provide components that guide various electrical circuitry of the battery module while providing the desired amount of support and protection within the housing. Further, it may be desirable to integrate these components with the housing of the battery module.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

The present disclosure relates to a battery module. The battery module includes a housing defined by one or more walls. A wall of the housing includes an opening configured to create a passageway between an interior of the housing and an exterior of the housing. The battery module includes a connector barrel disposed within the opening. The connector barrel is a hollow conduit with a first open end opposite a second open end, and the connector barrel is configured to receive a low voltage signal connector through the first open end and a vehicle control module connector through the second open end. An external surface of the connector barrel includes a pair of protrusions configured to enable intimate contact between the wall of the housing and the connector barrel.

The present disclosure also relates to battery module having a housing defined by one or more walls. The wall of the housing comprises an opening configured to create a passageway between an interior of the housing and an exterior of the housing. The battery module includes a connector barrel disposed within the opening, and the connector barrel includes a first open end opposite a second open end. The first open end receives a low voltage signal connector disposed within the housing and the second open end receives a vehicle control module connector disposed outside of the housing. The low voltage signal connector and the vehicle control module connector are communicatively connected within the connector barrel. The connector barrel is coupled to the wall of the housing.

The present disclosure also relates to a method of manufacturing a battery module. The method includes disposing a plurality of electrochemical cells within a housing of the battery module. The housing is defined by one or more walls. The method also includes forming an opening within a wall of housing to create a passageway between an interior of the housing and an exterior of the housing. The method also includes inserting a connector barrel into a custom housing mold tool. The connector barrel is a hollow conduit comprising a first open end opposite a second open end, and the connector barrel is positioned through the opening such that the first open end opens to the interior of the housing and the second open end opens to the exterior of the housing. The method also includes injecting a molten polymer into the custom housing mold tool and around the connector barrel to form a connection between the connector barrel and the wall of the housing.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include a housing having a connector barrel configured to enable passage of electrical circuitry therethrough, such that the connector barrel supports and guides electrical circuitry disposed within the housing. In certain embodiments, the connector barrel may guide and route one or more electrical signal connectors, such as a low voltage signal connector and a vehicle control module connector that connect the battery module to a vehicle control module. Specifically, the low voltage signal connector and the vehicle control module connector may be utilized to connect the electronics and/or control circuits disposed within the housing of the battery module to a vehicle control module. In certain embodiments, the connector barrel may guide and/or route other types of electrical circuitry, such a high voltage connector (which may be used to connect the power output of the battery module to the vehicle power system) or a grounding stud (which may serve as a connection point to connect the battery module to the ground). Indeed, while the connector barrel may be utilized to guide and route a variety of different types of electrical circuitry disposed within the housing, embodiments of the present disclosure will be discussed with respect to the low voltage signal connector and the vehicle control module connector.

In certain embodiments, the connector barrel may be a hollow conduit having a body portion and two open ends disposed on opposite ends of the body portion. In certain embodiments, the low voltage signal connector may mate with a complementary vehicle control module connector within the connector barrel. Specifically, the connector barrel may be configured to house both the low voltage signal connector and the vehicle control module connector within the hollow conduit. For example, the low voltage signal connector may pass through a first open end of the hollow conduit to mate and connect with the vehicle control module connector as it passes through the second open end of the hollow conduit. In this manner, the connector barrel may be utilized to connect the electronics and/or control circuits disposed within the housing of the battery module to a vehicle control module outside the battery module. In certain embodiments, the connector barrel may be disposed through an opening within a wall of the housing. The opening through the wall of the housing may be configured such that a first open end of the connector barrel is disposed within the housing and a second open end of the connector barrel is disposed outside of the housing. Accordingly, the low voltage signal connector may be received in the first open end within the housing and the vehicle control module connector may be received in the second open end outside of the housing. Further, the two connector mate in the middle of the hollow conduit of the connector barrel, thereby providing communication between the battery module and the vehicle control module.

In certain embodiments, the connector barrel may be fixed to or integral with the housing of the battery module (e.g., the connector barrel may be welded to or molded with the walls of the housing). For example, an exterior surface of the body of the connector barrel may include a number of protrusions (e.g., boxed protrusions) disposed adjacent to one another and configured to enable intimate contact between the connector barrel and walls of the housing. In certain embodiments, a slot may be created between a pair of protrusions that extends around the external perimeter of the body, through which a portion of the housing may be inserted. Indeed, the slot may extend along the entire external perimeter of the body and/or may extend along a portion of the external perimeter. In this manner, the protrusions may be configured to secure the external perimeter of the body to a portion of the housing without otherwise blocking the open ends of the connector barrel.

In certain embodiments, the exterior surface of the body of the connector barrel may include a number of flexible ribs that may each be configured to flex to create a secure and tight connection between the connector barrel and the walls of the housing. The flexible ribs may additionally flex to accommodate variable dimensions of the connector barrel and the opening through the wall of the housing, thereby enabling a more accurate fit between the connector barrel and the housing. In certain embodiments, the flexible ribs may additionally provide structural support for the electrical components from various loads and impacts that the battery module may be subject to.

In certain embodiments, the geometry of the connector barrel may be designed so that a user may ergonomically and accurately manipulate the connector barrel. For example, in certain embodiments, the connector barrel may be designed with a poka-yoke configuration to help prevent user error when the connector barrel is inserted into the housing. For example, in certain embodiments, one or more of the protrusions may include an asymmetrical shape that helps a user orient the connector barrel in the correct position within the housing. Specifically, the asymmetrical shape of the connector barrel may only allow for a single orientation within the opening of the wall of the housing. Furthermore, in certain embodiments, the geometry and design of the connector barrel, and more specifically, the geometry and design of the connector barrel in relation to the housing of the battery module, may be configured to allow a user to easily manipulate the connector barrel. These and other features of the present embodiments will be described in detail below with reference to the figures.

Figure 1:
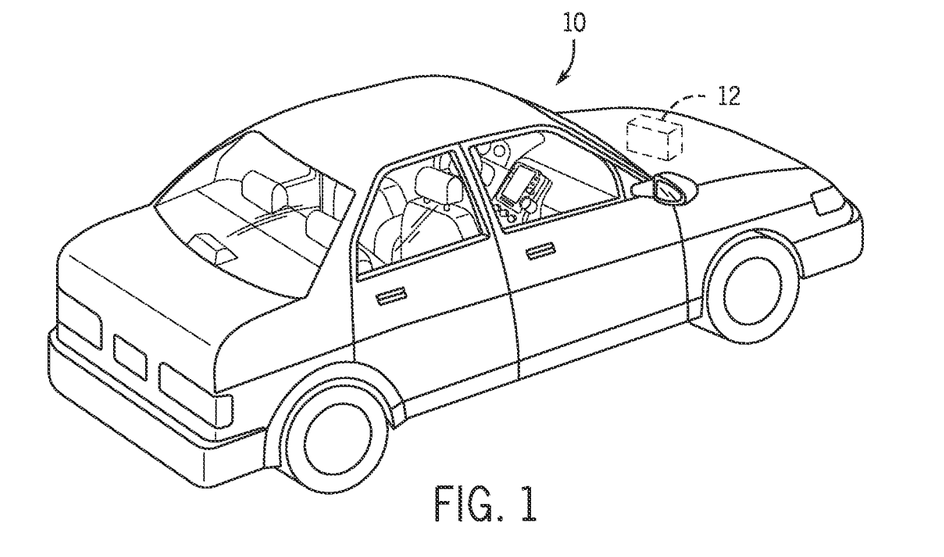
FIG. 1 is a perspective view of a vehicle having a battery system configured in accordance with present embodiments to provide power for various components of the vehicle, in accordance with an aspect of the present disclosure.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
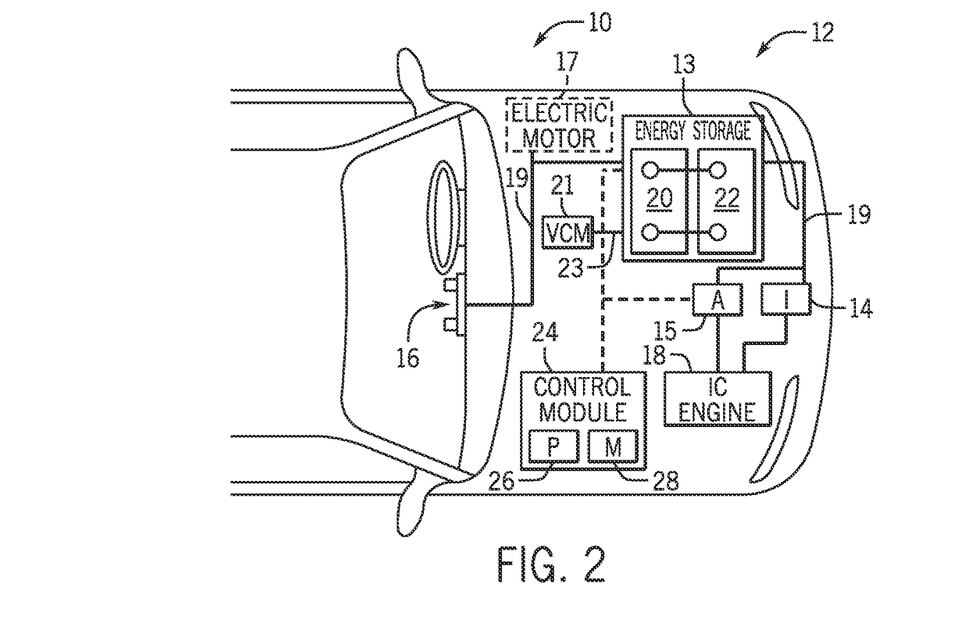
FIG. 2 is cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, a vehicle control module (VCM) 21, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Additionally, the vehicle 10 may include the VCM 21 that may control one or more operational parameters of the various components of the vehicle 10. In certain embodiments, the VCM 21 may include one or more processor 26 and one or more memory 28 programmed to perform such tasks. The battery modules 20, 22 may be coupled to the VCM 21 via one or more communication lines. For example, a vehicle control module line 23 may be utilized to couple the VCM 21 to the battery module 20, as further described in detail below. The VCM 21 may receive input from the battery modules 20, 22 (and more specifically, from the control module 24) regarding various parameters, such as a state of charge and temperature. The VCM 21 may be configured to utilize the received information to determine when to charge and/or discharge the battery module 20, when to discontinue charging the battery module 20, and so forth.

Figure 3:
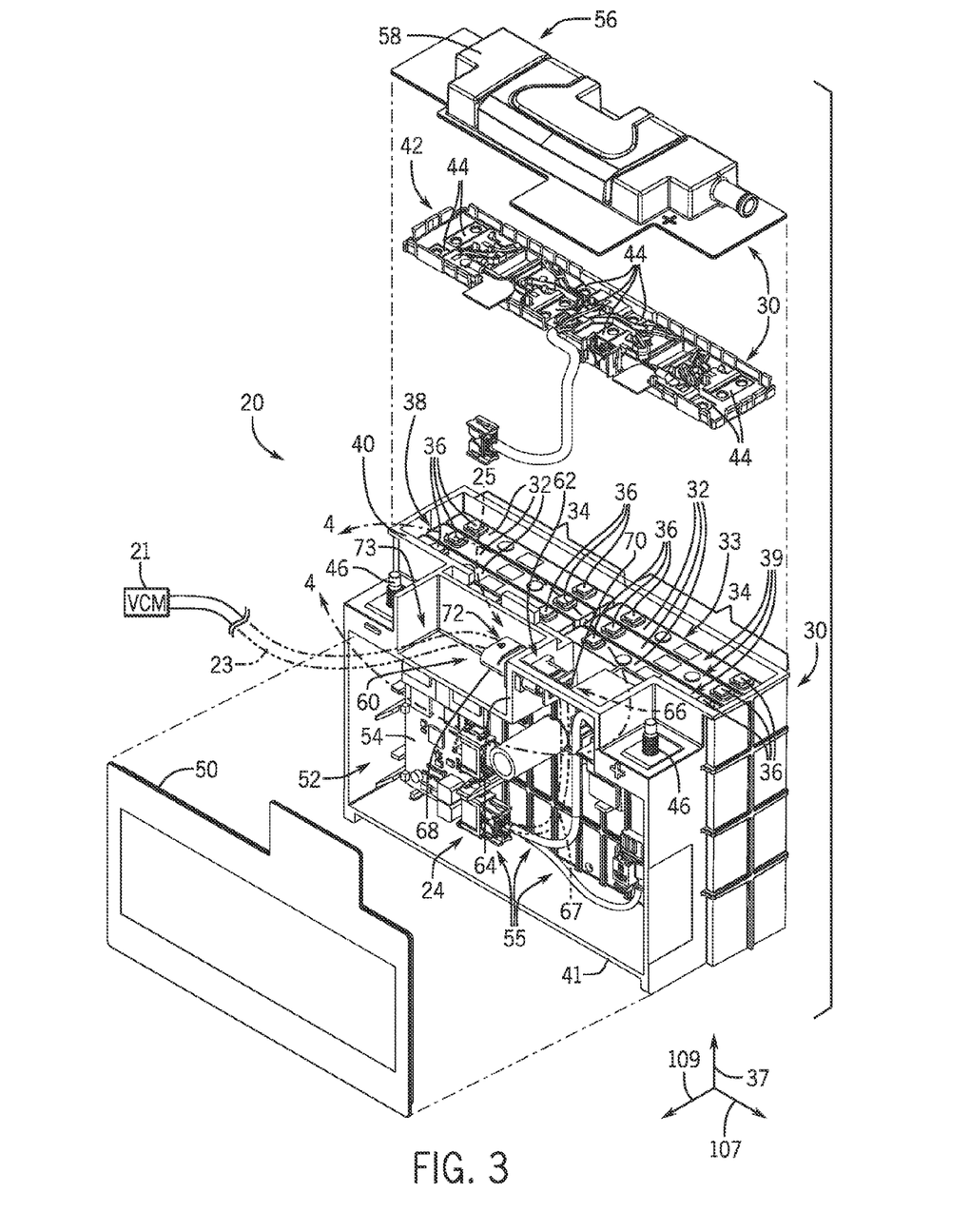
FIG. 3 is a perspective view of an embodiment of a battery module for use in the vehicle of FIG. 2, in accordance with an aspect of the present disclosure.

An overhead exploded perspective view of an embodiment of the battery module 20 for use in the vehicle 10 of FIG. 2 is shown in FIG. 3. In the illustrated embodiment, the battery module 20 (e.g., lithium ion [Li-ion] battery module) includes a housing 30 and electrochemical cells 32 disposed inside the housing 30. For example, the electrochemical cells 32 are received through a cell receptacle region 33 of the housing 30 and into the inside of the housing 30. In the illustrated embodiment, six prismatic lithium-ion (Li-ion) electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 extending upwardly (e.g., in direction 37) from terminal ends 39 of the electrochemical cells 32. Accordingly, the terminals 36 may extend outwardly from the cell receptacle region 33 toward an upper side 40 (e.g., upper end or face opposite a base 41) of the housing 30. For example, the electrochemical cells 32 may be inserted into the housing 30 through the cell receptacle region 33 in the upper side 40, and positioned within the housing 30 such that the terminals 36 of the electrochemical cells 32 are disposed in the cell receptacle region 33. A bus bar carrier 42 may be disposed into the cell receptacle region 33 and may retain bus bars 44 disposed thereon, where the bus bars 44 are configured to interface with the terminals 36 of the electrochemical cells 32. For example, the bus bars 44 may interface with the terminals 36 to electrically couple the electrochemical cells 32 together. Depending on the embodiment, the bus bars 44 may couple the electrochemical cells 32 in series, in parallel, or some of the electrochemical cells 32 in series and some of the electrochemical cells 32 in parallel. Further, certain of the bus bars 44 may be configured to electrically couple the electrically interconnected group of electrochemical cells 32 with major terminals 46 of the battery module 20, where the major terminals 46 are configured to be coupled to a load (e.g., component(s) of the vehicle 10) to power the load.

In the illustrated embodiment, the housing 30 of the battery module 20 includes one or more covers configured to seal the housing 30. For example, the cell receptacle region cover 56 may be disposed over the upper side 40 of the housing 30 (and over the bus bar carrier 42) to seal the upper side 40 of the housing 30. In certain embodiments, the bus bar carrier 42 may be coupled to the housing 30 to fix the bus bar carrier 42 within the cell receptacle region 33 and over the electrochemical cells 32. As a further example, the housing 30 may include an electronics compartment cover 50 that fits over an electronics compartment 52 of the housing 30, where the electronics compartment 52 of the housing 30 retains, for example, a printed circuit board (PCB) 54 and other electrical components 55 (e.g., a relay, communications lines, etc.) of the battery module 20. In certain embodiments, the electronics compartment cover 50 and/or the cell receptacle region cover 56 may be welded (e.g., laser welded) to the body of the housing 30.

In accordance with embodiments of the present disclosure, a connector barrel 60 may be disposed through an opening 62 within a wall 64 of the housing 30. The opening 62 may be a passageway between the interior of the housing 30 and the exterior of the housing 30. Specifically, the connector barrel 60 may be configured to receive a low voltage signal connector 66 from the control module 24 disposed within the interior of the electronics compartment 52 within the housing 30. Likewise, the connector barrel 60 may be configured to receive the vehicle control module connector 25 from the VCM 21 disposed within the vehicle. In certain embodiments, the low voltage signal connector 66 may be communicatively coupled to a low voltage signal line 67 and the vehicle control module connector 25 may be communicatively coupled to the vehicle control module line 23. In this manner, the low voltage signal line 67 and the vehicle control module line 23 may be communication lines that are configured to communicatively couple the control module 24 with the VCM 21, as further described in detail below.

Figure 5:
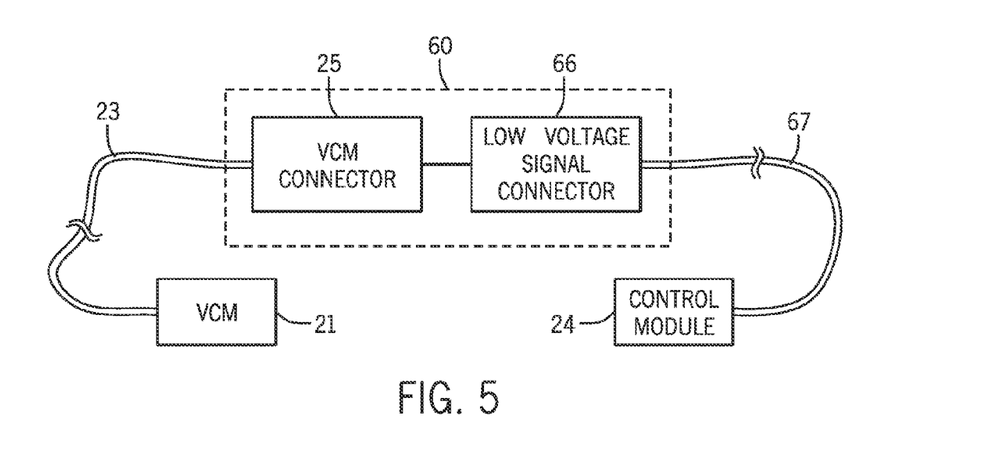
FIG. 5 is a schematic representation of an embodiment of the connector barrel of FIG. 3 for use in the battery module of FIG. 3, illustrating a low voltage signal connector and a vehicle control module connector disposed within the connector barrel, in accordance with an aspect of the present disclosure.

Indeed, the low voltage signal connector 66 and the vehicle control module connector 25 may be configured to mate within the connector barrel, as further described with respect to FIG. 5. In such embodiments, the connectors 66, 25 may work with the low voltage signal line 67 and the vehicle control module line 23 to connect the control module 24 to the VCM 21. Specifically, the low voltage signal connector 66 and the vehicle control module connector 25 (working with the low voltage signal line 67 and the vehicle control module line 23) may be configured to provide information related to the condition of the battery module 20 to the vehicle control module 21. For example, in certain embodiments, information related to state of the charge of the battery module 20, the temperature of the battery module 20, one or more warnings related to the battery module 20, a status change of the battery module 20, or any other information related to the overall condition of the battery module 20 may be transmitted to the VCM 21.

In certain embodiments, the connector barrel 60 may be a hollow conduit having a body portion 68, a first open end 70, and a second open end 72 opposite the first open end 70. In particular, the first open end 70 may be disposed inside the housing 30 and may be configured to receive the low voltage signal connector 66 within the housing 30. Further, the second open end 72 may be disposed outside the housing 30 and may be configured to receive the vehicle control module connector 25 outside the housing 30. Specifically, the second open end 72 may be disposed within a recess 73 of housing 30, such that the connector barrel 60 may be inserted into the opening 62 via the recess 73, as further described with respect to FIG. 7. As noted above, the low voltage signal connector 66 and the vehicle control module connector 25 may mate within the hollow body portion 68 of the connector barrel 60. In this manner, the connector barrel 60 may house the low voltage signal connector 66 from inside the housing 30 of the battery module 20 and the vehicle control module connector 25 from outside of the battery module 20. Accordingly, the opening 62 disposed within the wall 64 of the housing 30 may be configured to secure the connector barrel 60 and allow the passage of the low voltage signal connector 66 and the vehicle control module connector 25.

It should be noted that the opening 62 disposed within the wall 64 may be configured to receive the connector barrel 60. For example, the opening 62 may be sized to securely receive an external perimeter of the body of the connector barrel 60. In other words, the connector barrel 60 may have a perimeter sized to match the opening 62.

In certain embodiments, the connector barrel 60 may be welded or otherwise coupled to the wall 64 of the housing 30 to fix the connector barrel 60 within the opening 62. In certain embodiments, the connector barrel 60 may be insert-molded. Specifically, the connector barrel 60 may be formed into the housing 30. The connector barrel 60 is loaded and/or inserted into the housing mold tool. Further, molten polymer may be injected into the housing mold tool and formed around the connector barrel 60 creating a connection between the connector barrel 60 and the housing 30. The connector barrel 60 may be placed through the opening 62 of the housing 30 and welded or otherwise coupled to the wall 64 of the housing 30. In particular, in certain embodiments, an operator may insert the connector barrel 60 into the housing 30 in a desired orientation (as further described with respect to FIG. 7). In certain embodiments, due to manufacturing imperfections (e.g., tolerances) and other factors described in detail below, dimensions of the opening 62 within the housing and dimensions of the connector barrel 60 may only partially correspond with one another. In such situations, one or more features disposed on an exterior surface 74 of the body 68 of the connector barrel 60 may help secure the connector barrel 60 to the wall 64 of the housing 30, as further described in detail with respect to FIG. 4.

Figure 4:
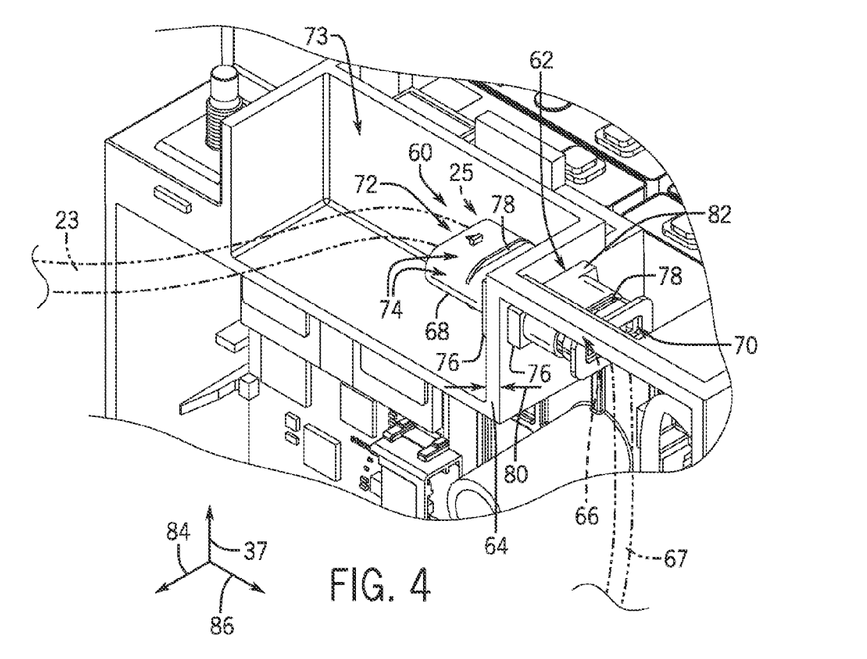
FIG. 4 is a detailed view of the battery module of FIG. 3 taken along lines 4-4 of FIG. 3, illustrating a connector barrel for use in the battery module of FIG. 3, in accordance with an aspect of the present disclosure.

FIG. 4 is a detailed view of the battery module 20 of FIG. 3 taken along lines 4-4, illustrating the connector barrel 60 in accordance with an aspect of the present disclosure. As shown, the first open end 70 may be disposed inside the housing 30 and may be configured to receive the low voltage signal connector 66 within the housing 30. Further, the second open end 72 may be disposed within a recess 73 of housing 30, and may be configured to receive the vehicle control module connector 25 within the recess 73 outside of the housing 30. As shown, features disposed on the exterior surface 74 of the body 68 of the connector barrel 60 may help secure the connector barrel 60 to the wall 64 of the housing 30. Specifically, the exterior surface 74 of the body 68 may include one or more protrusions 76 (e.g., boxed protrusions) and/or one or more flexible ribs 78 that help to secure the connector barrel 60 within the opening 62 of the wall 64. In this manner, the connector barrel 60 is secured to the wall 64 without blocking the open ends 70, 72.

Figure 6:
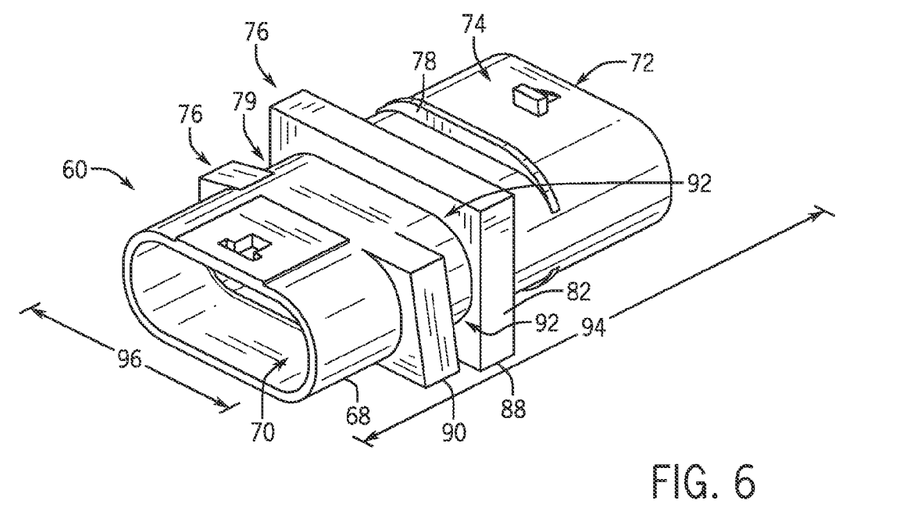
FIG. 6 is a perspective view of an embodiment of the connector barrel for use in the battery module of FIG. 3, in accordance with an aspect of the present disclosure.

In certain embodiments, the one or more protrusions 76 may be configured to secure the connector barrel 60 to the wall 64 of the housing 30. For example, a slot 79 (or a groove) (as illustrated in FIG. 6), may be created between a pair of the protrusions 76 disposed on the exterior surface 74 of the body 68. Specifically, the slot 79 may extend totally or partially around the perimeter of the body 68, and may be configured to receive a portion of the wall 64, as shown in FIG. 4. In certain embodiments, a thickness 80 of the wall 64 may be configured such that the wall 64 securely couples (e.g., fits) within the slot 79 created by the pair of protrusions 76. In this manner, the wall 64 may surround an entire external perimeter (cross-section) of the connector barrel 60, thereby securing the connector barrel 60 to the structure of the housing 30 without blocking any portion of the first open end 70 or the second open end 72. Accordingly, in certain embodiments, the thickness 80 of the wall 64 may correspond to the slot 79 or the distance between the pair of the protrusions 76. Further, it should be noted that in certain embodiments, the thickness 80 of the wall 64 may be maximized in order to support the connector barrel 60 as well as the low voltage signal connector 66 passing through the connector barrel 60. In certain embodiments, the thickness 80 of the wall 64 and the coupling of the wall 64 within the corresponding slot 79 may help to support the weight of the connector barrel 60 as well as the low voltage signal connector 66 passing through the connector barrel 60.

In certain embodiments, a lip portion 82 of each of the protrusions 76 may contact a portion of the wall 64, thereby allowing the connector barrel 60 to remain coupled to the housing 30 during operation of the battery module 20. For example, the lip 82 may extend outwardly from the exterior surface 74 of the body of the connector barrel 60 to contact a portion of the wall 64. Further, the lip 82 may help secure the pair of protrusions 76 against the wall 64 of the housing 30, and may help prevent the connector barrel 60 from sliding out of position within the opening 62. In particular, in certain embodiments, the pair of protrusions 76 may help to reduce rotational and lateral movements of the connector barrel 60 relative to the housing 30, and may help retain the connector barrel 60 within a particular position within the housing 30. As noted above, in certain embodiments, the protrusions 76 may be boxed protrusions. For example, a cross-section of the protrusions 76 through the connector barrel 60 may result in a rectangular shape with sharp or rounded corners. In other words, the protrusions 76 may extend outwardly from the exterior surface 74 of the connector barrel 60 to form a rectangular or generally rectangular perimeter that totally or partially extends along the perimeter of the connector barrel 60. It should be noted that in certain embodiments, the protrusions 76 may extend outwardly from the exterior surface 74 to create any geometry that is suitable for supporting the connector barrel 60 and/or the low voltage signal connector 66.

In certain embodiments, the one or more flexible ribs 78 may also be disposed on the exterior surface 74 of the body 68. In certain embodiments, the one or more flexible ribs 78 may be disposed proximate to the protrusions 76, and may be configured to provide additional structural support for the connector barrel 60. In certain embodiments, the one or more flexible ribs 78 may be utilized in addition to the protrusions 76 and/or in lieu of the flexible ribs 78. In certain embodiments, the flexible ribs 78 may flex inwards or outwards to accommodate the wall 64 of the housing 30, thereby enabling a more secure and accurate fit between the connector barrel 60 and the housing 30. For example, due to manufacturing imperfections (e.g., tolerances) and other factors described in detail below, dimensions of the opening 62 within the housing and dimensions of the connector barrel 60 may only partially correspond with one another. In such situations, the flexible ribs 78 of the connector barrel 60 may help secure the connector barrel 60 to the wall 64 of the housing 30. In certain embodiments, the flexible ribs 78 may allow a user to ergonomically and accurately manipulate the connector barrel 60. For example, the flexible ribs 78 may allow a user to grip the connector barrel 60 as it is being inserted into the opening 62 of the housing 30, thereby allowing for a greater ease of use.

FIG. 5 is a schematic of an embodiment of the connector barrel 60 of FIG. 3 for use in the battery module 20 of FIG. 3. As shown, the low voltage signal connector 66 and the vehicle control module connector 25 are partially housed within the connector barrel 60. Specifically, the low voltage signal connector 66 and the vehicle control module connector 25 are configured to communicatively couple within the connector barrel 60. As noted above, the connectors 25, 66 may be utilized to transmit information related to the condition of the battery module 20 from the battery module 20 to the VCM 21. For example, the low voltage signal connector 66 may be communicatively coupled to the low voltage signal line 67 and the vehicle control module connector 25 maybe communicatively coupled to the vehicle control module line 23. In this manner, the low voltage signal line 67 and the vehicle control module line 23 may transfer information from the control module 24 to the VCM 21.

As described below with respect to FIGS. 6-7, the connector barrel 60 may be designed to receive and secure the connectors 25, 66. Specifically, the dimensions of the connector barrel 60 (including the hollow conduit having the body portion 68) may be configured to securely receive the connectors 25, 66, so that the connectors 25, 66 are secure during operation of the battery module 20, as further described with respect to FIGS. 6-7.

FIG. 6 is a perspective view of an embodiment of the connector barrel 60 for use in the battery module 20 of FIG. 3, in accordance with an aspect of the present disclosure. As shown, the connector barrel 60 may generally be a hollow conduit that is configured to receive and secure the low voltage signal connector 66 and the vehicle control module connector 25. In certain embodiments, the connector barrel 60 may generally include the first and second open ends 70, 72 that are oval in shape, with the body portion 68 extending between the first and second open ends 70, 72. However, it should be noted that in other embodiments, the connector barrel 60 may include open ends having different shapes, such as a square, a circle, or an obround shape. For example, the open ends 70, 72 may be any geometry that corresponds to the geometry of the low voltage signal connector 66 or the vehicle control module connector 25. Further, it should be noted that the general shape of the hollow conduit (e.g., the body 68) may additionally take any shape that is conducive to the opening 62 disposed within the wall 64.

Additionally, while a pair of protrusions 76 is shown in the illustrated embodiment, it should be noted that any number of protrusions 76 (e.g., 1, 3, 4, 5, 6, 7, 8 or more) may be disposed on the exterior surface 74 of the connector barrel 60. As noted above, the protrusions 76 may help to support the connector barrel 60, the vehicle control module connector 25, and the low voltage signal connector 66 within the wall 64. Likewise, any number of flexible ribs 78 (e.g., 2, 3, 4, 5, 6, 7, 8 or more) may be disposed on the exterior surface 74. The flexible ribs 78 may help support the structure of the connector barrel 60, and may also help to accommodate the wall 64 when the connector barrel 60 is inserted into the wall 64. Further, the protrusions 76 may all include the same or a similar size and/or shape, or the protrusions 76 may vary in size and/or shape. For example, as shown, a first protrusion 88 may be similar to a second protrusion 90 in shape (e.g., rectangular cross-section), while the second protrusion 90 is smaller in size than the first protrusion 88. In certain embodiments, the size and shape of each of the first and second protrusions 88, 90 may be similar and/or substantially the same. The size and shape of each the first and second protrusions 88, 90 may depend, at least in part, on a desired geometry for the slot 79 and the corresponding geometry (e.g., thickness 80) of the wall 64 of the housing 30.

In certain embodiments, the shape of the protrusions 76 may vary between the one or more protrusions 76 of the connector barrel 60. It should be noted that the protrusions 76 may be generally any shape, as long as the protrusions 76 include a contact surface 92 that is configured to contact a portion of the wall 64. As generally noted above, the contact portion 92 of the protrusions 76 may be created by the lip portion 82 that extends outwardly from the exterior surface 74 of the connector barrel 60. In the illustrated embodiment, the protrusions 76 are specifically sized, shaped, and positioned to support the connector barrel 60 (and in some cases, the low voltage signal connector 66 and the vehicle control module connector 25) within the wall 64.

The dimensions of the connector barrel 60 (e.g., a length 94 or a width 96) may be designed such that the connector barrel 60 fits securely within the opening 62 of the wall 64. In certain embodiments, it may be beneficial to minimize the dimensions of the connector barrel 60 so that the connector barrel 60 includes enough surrounding space for the low voltage signal connector 66 to be routed through. Further, in certain embodiments, the dimensions of the connector barrel 60 may be designed such that the low voltage signal connector 66 are routed through the body 68 of the connector barrel 60 without any sharp angles or bends that may damage the low voltage signal connector 66. For example, in certain embodiments, the length 94 of the connector barrel 60 may be sufficiently long enough to accommodate the low voltage signal connector 66 and the vehicle control module connector 25. In certain embodiments, the dimensions of the connector barrel 60 may be designed to securely fit over the low voltage signal connector 66 and the vehicle control module connector 25. Further, in certain embodiments, the dimensions of the connector barrel 60 may be designed to securely tuck the electrical circuitry passing through within the housing 30 of the battery module 20, thereby protecting the electrical circuitry from undesired events or movements of the battery module 20 (such as during operation of the battery module 20).

Figure 7:
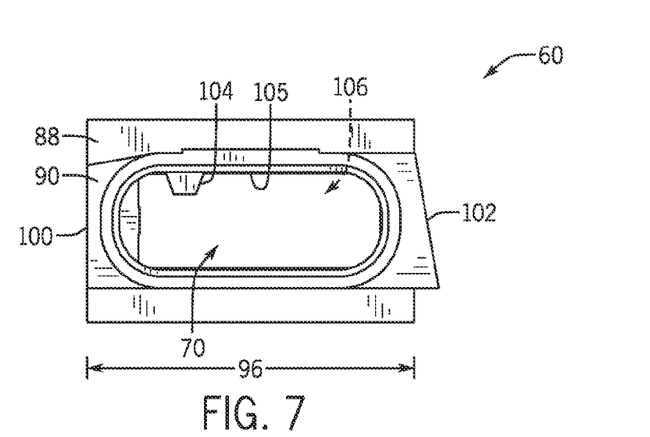
FIG. 7 is a front view of the connector barrel of FIG. 4, in accordance with an aspect of the present disclosure.

FIG. 7 is a front view of the connector barrel 60 of FIG. 4, in accordance with an aspect of the present disclosure. In certain embodiments, the connector barrel 60 may include a poka-yoke configuration to help prevent user error as the connector barrel 60 is inserted into the housing. For example, in the illustrated embodiment, the poka-yoke configuration is created by the second protrusion 90. In the illustrated embodiment, a first edge 100 of the second protrusion 90 is straight while a second edge 102 of the second protrusion 90 is angled (e.g., beveled) at a non-90 degree angle. That is, in certain embodiments, the protrusions 76 may have an asymmetrical geometry. The differences between the first and second edges 100 and 102 may be designed to help a user avoid mistakes when inserting the connector barrel 60 within the opening 62 of the housing 30. For example, the angled second edge 102 may only fit into the opening 62 if the connector barrel 60 is positioned in the correct orientation. While the illustrated embodiment depicts the poka-yoke configuration with respect to the second protrusion 90, it should be noted that any behavior-shaping constraint may be included into the design of the connector barrel 60 in order to help a user find the correction orientation for the connector barrel 60 as it is inserted into the housing 30 (or into the custom mold tool in which the housing is formed).

In certain embodiments, additional notches 104 may be disposed within/on an internal surface 105 of the connector barrel 60 such that they extend into the hollow interior 106 of the body 68. Specifically, these notches 104 may be utilized to separate the hollow interior 106 into one or more sections, thereby providing one or more fastening elements or additional guide posts for the connector barrel 60. While the illustrated embodiment only depicts one notch 104, it should be noted that any number (e.g., 2, 3, 4, 5, 6, 7, 8 or more) of notches 104 may be disposed throughout the connector barrel 60 and may be configured as additional guides. In certain embodiments, the notches 104 may extend along the length 94 of the connector barrel 60, and may be configured as guide rails that guide the low voltage signal connector 66 and the vehicle control module connector 25 into the connector barrel 60 in an appropriate orientation.

One or more of the disclosed embodiments, alone or in combination, may provide one or more technical effects useful in the manufacture of battery modules, and portions of battery modules. In general, embodiments of the present disclosure are directed to a battery module 20 having a housing 30 and a connector barrel 60 disposed within the housing 30. In certain embodiments, the connector barrel 60 may be a hollow conduit having a body 68 and two open ends 70, 72 disposed on opposite ends of the body 68. Specifically, the low voltage signal connector 66 and the vehicle control module connector 25 are communicatively coupled within the connector barrel 60. For example, the low voltage signal connector 66 is received through the first open end 70 of the connector barrel 60 to mate and connect with the vehicle control module connector 25 received through the second open end of the connector barrel 60. In this manner, the connectors 25, 66 transmit information related to the condition of the battery module 20 from the control module 24 to the VCM 21. In certain embodiments, the connector barrel 60 may be fixed or integral to the housing 30 of the battery module 20. For example, a number of protrusions 76 and/or flexible ribs 78 may be disposed adjacent to one another on an exterior surface 74 of the connector barrel 60, and may be configured to enable intimate contact between the connector barrel 60 and the wall 64 of the housing 30. In certain embodiments, the connector barrel 60 may be designed with a poka-yoke configuration to help prevent user error when the connector barrel 60 is inserted into the housing 30.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
 a housing defined by one or more walls, wherein a wall of the housing comprises an opening configured to create a passageway between an interior of the housing and an exterior of the housing; and
 a connector barrel disposed within the opening, wherein the connector barrel is a hollow conduit comprising a first open end opposite a second open end, and wherein the connector barrel is configured to receive a low voltage signal connector through the first open end and a vehicle control module connector through the second open end, and wherein an external surface of the connector barrel comprises a pair of protrusions configured to enable intimate contact between the wall of the housing and the connector barrel.

2. The battery module of claim 1, wherein the low voltage signal connector and the vehicle control module connector are configured to communicatively couple within the connector barrel.

3. The battery module of claim 2, wherein the low voltage signal connector and the vehicle control module connector are communicatively coupled to communication lines configured to relay information related to a condition of the battery module from the battery module to the vehicle control module.

4. The battery module of claim 1, wherein the pair of protrusions extend from the external surface of the connector barrel.

5. The battery module of claim 4, comprising a slot disposed between the pair of protrusions and extending along a part of the external perimeter of the connector barrel or extending along the entire external perimeter of the connector barrel.

6. The battery module of claim 5, wherein a portion of the wall fits securely within the slot between the pair of protrusions.

7. The battery module of claim 1, wherein the pair of protrusions are similar in size and shape.

8. The battery module of claim 1, wherein the pair of protrusions comprise a different size and a different shape.

9. The battery module of claim 1, wherein the pair of protrusions comprise a first protrusion having a first edge and a second edge, and wherein the first edge is angled differently than the second edge.

10. The battery module of claim 9, wherein the first edge and the second edge create a poka-yoke configuration configured to help reduce user error in orienting the connector barrel within the opening.

11. The battery module of claim 1, wherein an external surface of the connector barrel comprises a plurality of flexible ribs, and wherein the plurality of ribs are configured to enable intimate contact between the wall of the housing and the connector barrel.

12. The battery module of claim 1, wherein the housing comprises a recess, and wherein the second open end opens to the recess and the exterior of the housing.

13. A battery module, comprising:
a housing defined by one or more walls, wherein a wall of the housing comprises an opening configured to create a passageway between an interior of the housing and an exterior of the housing; and
a connector barrel disposed within the opening, wherein the connector barrel comprises a first open end opposite a second open end, and wherein the first open end receives a low voltage signal connector disposed within the housing and the second open end receives a vehicle control module connector disposed outside of the housing, and wherein the low voltage signal connector and the vehicle control module connector are communicatively connected within the connector barrel, and wherein the connector barrel is coupled to the wall of the housing.

14. The battery module of claim 13, wherein an external surface of the connector barrel comprises a pair of protrusions configured to enable intimate contact between the wall of the housing and the connector barrel.

15. The battery module of claim 14, comprising a slot between the pair of protrusions that is configured to receive a portion of the wall.

16. The battery module of claim 13, comprising a plurality of prismatic lithium-ion (Li-ion) electrochemical cells disposed in a cell receptacle opening of the housing.

17. The battery module of claim 13, wherein the housing comprises a recess, and wherein the second open end opens to the recess and the exterior of the housing.

18. The battery module of claim 13, wherein the low voltage signal connector and the vehicle control module connector are configured to relay information related to a stage of charge, a temperature, a status change, or an overall condition of the battery module from the battery module to a vehicle control module.

19. A method of manufacturing a battery module, comprising:
disposing a plurality of electrochemical cells within a housing of the battery module, wherein the housing is defined by one or more walls;
forming an opening within a wall of the housing to create a passageway between an interior of the housing and an exterior of the housing;
inserting a connector barrel into a custom housing mold tool, wherein the connector barrel is a hollow conduit comprising a first open end opposite a second open end, and wherein the connector barrel is positioned through the opening such that the first open end opens to the interior of the housing and the second open end opens to the exterior of the housing;
injecting a molten polymer into the custom housing mold tool and around the connector barrel to form a connection between the connector barrel and the wall of the housing; and
routing a low voltage signal connector coupled to a low voltage signal line through the first open end of the connector barrel.

20. The method of claim 19, comprising routing a vehicle control module connector coupled to a vehicle control module line through the second open end of the connector barrel.

21. The method of claim 20, comprising communicatively coupling the low voltage signal connector and the vehicle control module connector within the connector barrel to relay information from the battery module to the vehicle control module.

22. The method of claim 21, wherein the information comprises a stage of charge, a temperature, a status change, or an overall condition of the battery module.

* * * * *